(12) United States Patent
Dupielet et al.

(10) Patent No.: US 12,123,257 B2
(45) Date of Patent: Oct. 22, 2024

(54) CONTROL METHOD IN OPERATION OF A SUN PROTECTION APPARATUS AND ASSOCIATED APPARATUS

(71) Applicant: SOMFY ACTIVITES SA, Cluses (FR)

(72) Inventors: Norbert Dupielet, Cluses (FR); Eric Lagarde, Cluses (FR); Frédéric Maraval, Cluses (FR); Jean-Charles Benoin, Cluses (FR); Jean-Michel Perache, Cluses (FR); Jean-Charles Boeri, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 17/786,249

(22) PCT Filed: Dec. 18, 2020

(86) PCT No.: PCT/EP2020/086952
§ 371 (c)(1),
(2) Date: Jun. 16, 2022

(87) PCT Pub. No.: WO2021/123115
PCT Pub. Date: Jun. 24, 2021

(65) Prior Publication Data
US 2023/0019542 A1     Jan. 19, 2023

(30) Foreign Application Priority Data

Dec. 19, 2019   (FR) .................................... 1915013

(51) Int. Cl.
*E06B 9/322*   (2006.01)
*E06B 9/24*    (2006.01)

(52) U.S. Cl.
CPC ...... *E06B 9/322* (2013.01); *E06B 2009/2441* (2013.01); *E06B 2009/3222* (2013.01)

(58) Field of Classification Search
CPC ............ E06B 2009/2441; E06B 9/322; E06B 2009/3222; E06B 2009/2423; E06B 9/388;
(Continued)

(56) References Cited

U.S. PATENT DOCUMENTS

| | | | |
|---|---|---|---|
| 2005/0001574 A1* | 1/2005 | Bejean | E06B 9/32 318/468 |
| 2006/0113944 A1 | 6/2006 | Hindhede et al. | |

(Continued)

FOREIGN PATENT DOCUMENTS

| | | |
|---|---|---|
| CN | 1659357 A | 8/2005 |
| CN | 202731696 U | 2/2013 |

(Continued)

OTHER PUBLICATIONS

International Search Report for PCT/EP2020/086952 dated Mar. 22, 2021, 4 pages.

(Continued)

*Primary Examiner* — Abe Massad
*Assistant Examiner* — Jeremy C Ramsey
(74) *Attorney, Agent, or Firm* — NIXON & VANDERHYE

(57) ABSTRACT

A sun protection apparatus includes a shading device, including an upper bar, a lower bar and a screen disposed between the upper and lower bars. The apparatus also includes a motorized drive device, designed to deploy and fold away the screen, including a first electromechanical actuator, configured to move the upper bar, a second electromechanical actuator, configured to move the lower bar, and a control unit, configured to control the first and second actuators. The control unit controls the first actuator so as to (Continued)

move the upper bar then the second actuator so as to move the lower bar depending on the position and/or movement of the upper bar, or vice versa.

10 Claims, 9 Drawing Sheets

(58) Field of Classification Search
CPC ....... E06B 2009/388; E06B 2009/2627; E06B 2009/2625; E06B 9/32; E06B 9/38; E06B 9/262
See application file for complete search history.

(56) References Cited

U.S. PATENT DOCUMENTS

| | | | |
|---|---|---|---|
| 2012/0200247 A1* | 8/2012 | Baugh | G05B 19/042 318/468 |
| 2014/0000816 A1* | 1/2014 | Yeh | E06B 9/262 160/10 |
| 2018/0202227 A1 | 7/2018 | Lagarde et al. | |

FOREIGN PATENT DOCUMENTS

| | | | |
|---|---|---|---|
| CN | 107002462 A | 8/2017 | |
| CN | 107923220 A | 4/2018 | |
| CN | 208094471 U | 11/2018 | |
| DE | 10 2011 117 989 A1 | 5/2013 | |
| EP | 3434857 | 1/2019 | |
| EP | 3489452 A1 * | 5/2019 | ............ E06B 9/262 |
| JP | 2005-350850 | 12/2005 | |
| NL | 2019347 | 2/2019 | |
| NL | 2020475 | 2/2019 | |

OTHER PUBLICATIONS

Written Opinion of the ISA for PCT/EP2020/086952 dated Mar. 22, 2021, 5 pages.
FR Search Report for FR1915013 dated Jul. 9, 2020, 2 pages.

* cited by examiner

CONTROL METHOD IN OPERATION OF A SUN PROTECTION APPARATUS AND ASSOCIATED APPARATUS

CROSS-REFERENCE RELATED TO PRIOR APPLICATIONS

This application is the U.S. national phase of International Application No. PCT/EP2020/086952 filed Dec. 18, 2020 which designated the U.S. and claims priority to FR1915013 filed Dec. 19, 2019, the entire contents of each of which are hereby incorporated by reference.

BACKGROUND OF THE INVENTION

Field of the Invention

The present invention relates to a method for controlling operation of a solar protection installation. The present invention also relates to a solar protection installation adapted to implement this control method.

The present invention relates generally to the field of shading devices comprising at least a rail, a screen, a first bar, a second bar and a motorized drive device. The first bar is arranged between the rail and the second bar, in an assembled configuration of the occultation device. The screen is arranged between the first and second bars. The screen is configured to be driven by the motorized drive device to move. The motorized drive device moves, on the one hand, the first bar connected to the screen, between at least one first position and at least one second position, and, on the other hand, the second bar connected to the screen, between at least one third position and at least one fourth position.

Description of the Related Art

Systems for blinds comprising two bars for adjusting the occultation of an opening by a screen are known from documents NL 2019347 B1, NL 2020475 B1 and EP 3 434 857 A1. These systems make it possible to select the height of the area to be blacked out, as well as its position in height within the opening. To do this, each bar is connected to a winding shaft that initiates a vertical movement of the bar to which it is connected, when rotated by an electromechanical actuator. Each winding shaft is driven, independently, by a control unit. These systems also comprise a device for limiting the rotation of the winding shafts to avoid collision between the bars. Thus, each bar is driven independently of the other, while ensuring that no collision occurs between the two bars. These systems can make it cumbersome for the user to operate the blind, especially when he/she wishes to move the entire occultation area without changing the height.

Similar disadvantages exist with the hardware of document US 2012/0200247 A1.

SUMMARY OF THE INVENTION

The invention intends more particularly to remedy these disadvantages by proposing a method for controlling operation of a solar protection installation, that is more intuitive than known methods.

To this end, according to a first aspect, the present invention relates to a method for controlling operation of a solar protection installation, the installation comprising at least:

an occultation device, the occultation device comprising at least:
  a top bar,
  a bottom bar, and
  a screen, the screen being arranged between the top and bottom bars,
a motorized drive device, the motorized drive device being configured to deploy and fold the screen, the motorized drive device comprising at least:
  a first electromechanical actuator, the first electromechanical actuator being configured to move the top bar,
  a second electromechanical actuator, the second electromechanical actuator being configured to move the bottom bar, and
  a control unit, the control unit being configured to control the first and second electromechanical actuators.

According to the invention, the control unit controls:
  the first electromechanical actuator so as to move the top bar and then the second electromechanical actuator so as to move the bottom bar depending on the position and/or movement of the top bar;
or
  the second electromechanical actuator so as to move the bottom bar and then the first electromechanical actuator so as to move the top bar depending on the position and/or movement of the bottom bar.

Thanks to the invention, the movement of the respective bottom or top bar based on the position and/or movement of the respective top or bottom bar enables the user to adjust the occultation of an opening more easily and more intuitively by the screen of the occultation device.

According to advantageous but not mandatory aspects of the invention, such a control method incorporates one or more of the following features taken in any technically permissible combination:

The control unit controls:
  the second electromechanical actuator so as to move the bottom bar upward, until the bottom bar contacts the top bar, then
  the first and second electromechanical actuators so as to simultaneously move the top bar and the bottom bar upward, in an identical direction and speed movement for the top and bottom bars;
or
  the first electromechanical actuator so as to move the top bar downward, until the top bar contacts the bottom bar, then
  the first and second electromechanical actuators so as to simultaneously move the top bar and the bottom bar downward, in an identical direction and speed movement for the top and bottom bars.

The control unit controls:
  the first electromechanical actuator so as to move the top bar downward until the top bar contacts the bottom bar,
  the first electromechanical actuator so as to stop the movement of the top bar, then
  the second electromechanical actuator so as to move the bottom bar downward and away from the top bar;
or
  the second electromechanical actuator so as to move the bottom bar upward until the bottom bar contacts the top bar,
  the second electromechanical actuator so as to stop the movement of the bottom bar, then the first electromechanical actuator so as to move the top bar upward and away from the bottom bar.

The control unit controls the first electromechanical actuator so as to move the top bar and the second electromechanical actuator so as to simultaneously move the bottom bar, in an identical movement, in direction and speed, to that of the top bar.

The control unit controls the first electromechanical actuator so as to move the top bar and the second electromechanical actuator so as to simultaneously move the bottom bar, in a movement identical in speed and opposite in direction to that of the top bar.

When the top bar reaches an end-of-travel position, the control unit controls the first electromechanical actuator so as to stop the movement of the top bar and the second electromechanical actuator so as to move the bottom bar away from the top bar. When the bottom bar reaches an end-of-travel position, the control unit controls the second electromechanical actuator so as to stop the movement of the bottom bar and the first electromechanical actuator so as to move the top bar away from the bottom bar.

According to a second aspect, the present invention relates to a solar protection installation, the installation comprising at least:
an occultation device, the occultation device comprising at least:
  a top bar,
  a bottom bar, and
  a screen, the screen being arranged between the top and bottom bars,
a motorized drive device, the motorized drive device being configured to deploy and fold the screen, the motorized drive device comprising at least:
  a first electromechanical actuator, the first electromechanical actuator being configured to move the top bar,
  a second electromechanical actuator, the second electromechanical actuator being configured to move the bottom bar, and
  a control unit, the control unit being configured to control the first and second electromechanical actuators.

The control unit is configured to implement the method, according to the invention and as mentioned above.

In other words, the control unit comprises elements, in particular a microcontroller, for implementing the method according to the invention, especially for implementing steps of the method according to the invention.

This solar protection installation provides the same advantages as mentioned above with respect to the control method according to the invention.

According to advantageous but non-mandatory aspects of the invention, such a solar protection installation incorporates one or more of the following features taken in any technically permissible combination:
  The installation comprises a command unit, the command unit comprising at least one first selection element and at least one second selection element, distinct from the first selection element, and the first and second selection elements control the top and bottom bars via the control unit.
  A double press on the first selection element controls a stacking of the top and bottom bars in a predetermined high position of each of the top and bottom bars and a double press on the second selection element controls a stacking of the top and bottom bars in a predetermined low position of each of the top and bottom bars.
  The command unit comprises at least a third selection element, the first and second selection elements control the top and bottom bars, so as to set a position of an occultation area by the screen, and the third selection element controls the top and bottom bars, so as to set a vertical extent of the occultation area by the screen.
  The first and second selection elements are configured to select an action controlled by the third selection element and, optionally, the first and second selection elements are further configured to control fully opening or closing the screen.

BRIEF DESCRIPTION OF THE DRAWINGS

The invention will be better understood and other advantages thereof will become clearer in the light of the following description, of several embodiments of a method for controlling operation of a solar protection installation and of a solar protection installation adapted to implement such a method, according to its principle, given by way of example only and made with reference to the drawings, in which.

DESCRIPTION OF THE PREFERRED EMBODIMENTS

First, we describe, with reference to FIGS. 1 to 8, an installation I according to a first embodiment of the invention and installed in a building having an opening, not shown, window or door, equipped with a screen 13 belonging to an occultation or solar protection device, in particular a motorized blind.

The occultation or solar protection device is hereinafter referred to as an "occultation device". The occultation device comprises the screen 13.

Here, the installation I comprises the occultation device.

Here, the screen 13 can be formed, for example, from a pleated or honeycombed fabric.

With reference to FIGS. 1 to 8, a blind according to the first embodiment of the invention is described.

Figure 1:
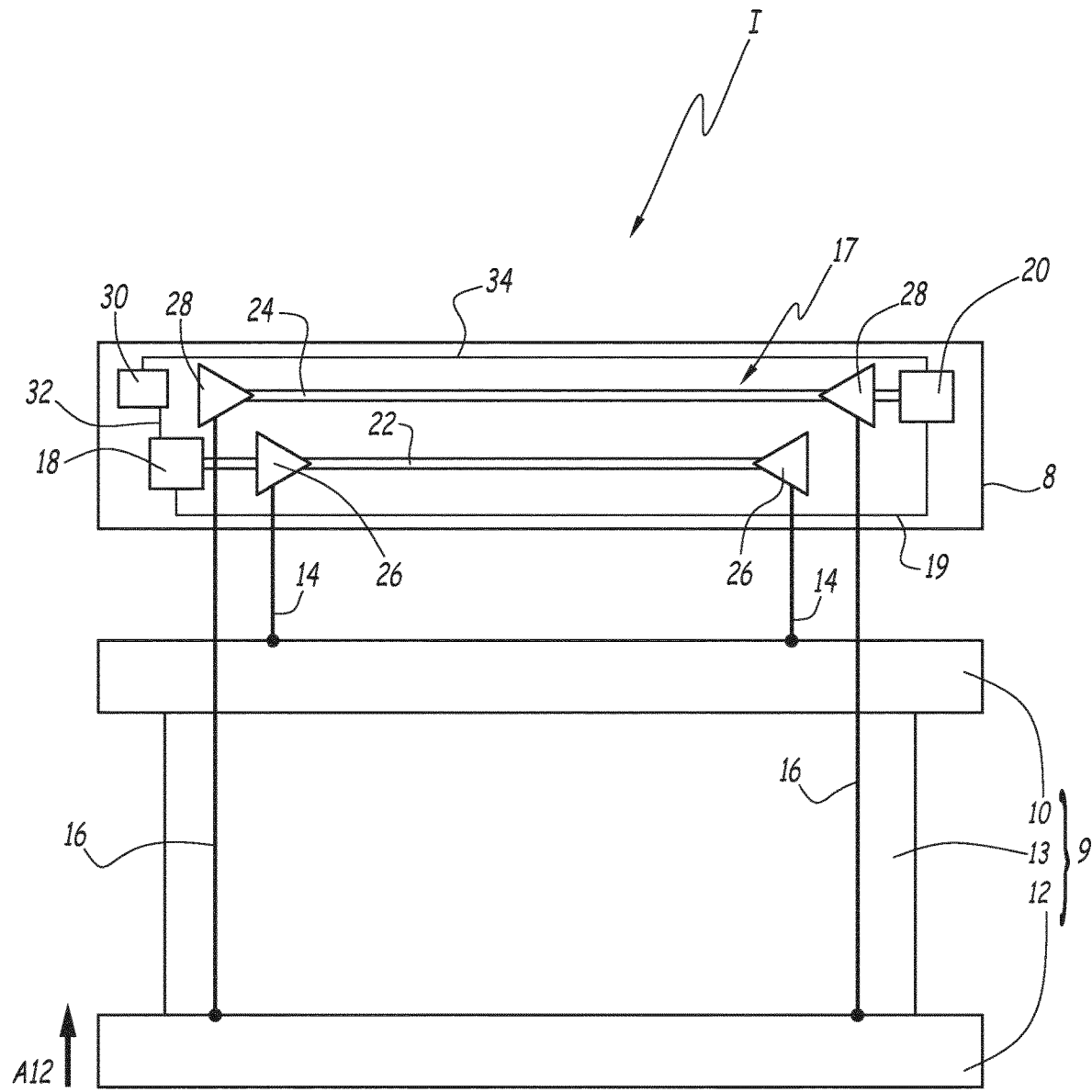
FIG. 1 is a schematic view of a solar protection installation according to a first embodiment of the invention, configured to implement a method for controlling operation thereof according to the invention, where top and bottom bars of an occultation device are in a first state.
Figure 1:
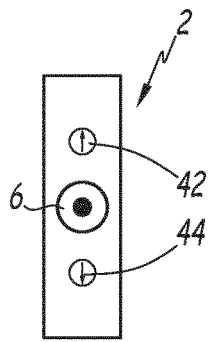

The installation I comprises a drive device 17 of a blind 9 provided for occulting, at least partially, the opening, such as a window provided in a wall of a building. The drive device 17 is configured to drive the top and bottom bars 10, 12 of the blind 9 vertically. The motorized drive device 17 comprises at least one electromechanical actuator 18, 20. Here and as illustrated in FIG. 1, the motorized drive device 17 comprises a first electromechanical actuator 18 and a second electromechanical actuator 20.

The drive device 17 is housed in a housing 8 of the blind 9 mounted at or above the opening. The housing 8 is generally referred to as a rail and, more particularly, as a top rail.

In an assembly mode, not shown, the housing 8 has a "U" shaped cross section.

The blind 9 comprises a screen 13. The screen 13 is arranged, in other words is configured to be deployed, between two bars 10, 12 of the blind 9, referred to as load bars.

The bars 10, 12 comprise a top bar 10, to which a top edge of the screen 13 is connected, and a bottom bar 12, to which a bottom edge of the screen 13 is connected, parallel to the top edge of the screen 13. Thus, the top bar 10 is parallel to the bottom bar 12, in an assembled configuration of the installation I. Furthermore, the top and bottom bars 10, 12 are parallel to the largest dimension of the housing 8, in the assembled configuration of the installation I. Depending on the relative position of the top and bottom bars 10, 12, the screen 13 is more or less deployed.

The motorized drive device 17 and, more particularly, the first and second electromechanical actuators 18, 20, is configured to rotate two winding shafts 22, 24, belonging to the blind 9.

The winding shafts 22, 24 comprise a top winding shaft 22 and a bottom winding shaft 24. The top winding shaft 22 is dedicated to the movement of the top bar 10 and the bottom winding shaft 24 is dedicated to the movement of the bottom bar 12. Here, the top and bottom winding shafts 22, 24 are parallel to the top and bottom bars 10, 12.

The top winding shaft 22 is equipped with two first winding pulleys 26, each of these first winding pulleys 26 being dedicated to wind or unwind a first cord 14 attached to the top bar 10. Each of the first cords 14 is attached onto the top bar 10 in an area near one of the ends of this top bar 10. Similarly, the bottom winding shaft 24 is equipped with two second winding pulleys 28, each of which second winding pulleys 28 being dedicated to wind or unwind a second cord 16 attached to the bottom bar 12. Each of the second cords 16 is attached onto the bottom bar 12 in an area near one of the ends of the bottom bar 12. The first and second cords 14, 16 connect the top and bottom bars 10, 12 to the top and bottom winding shafts 22, 24 and thus support the screen 13. When the first or second cords 14, 16 wind around the corresponding first or second winding pulleys 26, 28, the corresponding top bar 10 or bottom bar 12 moves up toward the motorized drive device 17 and, more particularly, toward the first and second electromechanical actuators 18, 20. Similarly, when the first or second cords 14, 16 unwind from the corresponding first or second winding pulleys 26, 28, the top bar 10 or bottom bar 12 moves down away from the housing 8.

The first and second winding pulleys 26, 28 are commonly referred to as winders.

The number of first and second winding pulleys related to the respective top and bottom winding shafts is not limiting and may be different, in particular greater than two.

Here and in no way limiting, the first and second winding pulleys 26, 28 are of a frustoconical shape.

Advantageously, the first and second winding pulleys 26, 28 are arranged inside the housing 8, in an assembled configuration of the blind 9.

The length of the first and second cords 14, 16 is provided so that these first and second cords 14, 16 are permanently tensioned, while keeping the top and bottom bars 10, 12 parallel to each other and parallel to the top and bottom winding shafts 22, 24.

Advantageously, the motorized drive device 17 and, more particularly, the first and second electromechanical actuators 18, 20, is controlled by a command unit 2. The command unit 2 may be, for example, a local command unit 2 or a central command unit, not shown.

Advantageously, the local command unit 2 can be connected to the central command unit, in a wired or wireless connection.

Advantageously, the central command unit can control the local command unit 2, as well as other similar local command units distributed in the building.

The motorized drive device 17 is, preferably, configured to execute the commands for deploying or retracting the screen 13, which may be emitted, especially, by the local command unit 2 or central command unit.

The installation I comprises either the local command unit 2, or the central command unit, or the local command unit 2 and the central command unit.

Means for controlling the motorized drive device 17 and, more particularly, the first and second electromechanical actuators 18, 20, enabling movement of the screen 13, comprise at least one control unit 30, in particular an electronic control unit. This control unit 30 is adapted to operate at least one electric motor, not shown, of the motorized drive device 17 and, more particularly, the electric motor of each of the first and second electromechanical actuators 18, 20 and, in particular, to enable the supply of electric power to the electric motor(s) of the first and second electromechanical actuators 18, 20. Here, the motorized drive device 17 and, more particularly, the first electromechanical actuator 18 comprises a first electric motor, not shown, and the second electromechanical actuator 20 comprises a second electric motor, not shown.

In addition to an electric motor, each of the first and second electromechanical actuators 18, 20 may comprises a gearbox, a brake, and/or a clutch, which are not shown.

Thus, the control unit 30 controls, especially, the first and second electric motors of the first and second electromechanical actuators 18, 20, so as to deploy or fold the screen 13, as previously described.

The means for controlling the motorized drive device 17 and, more particularly, the first and second electromechanical actuators 18, 20 comprise hardware and/or software means.

As a non-limiting example, the hardware means may comprise at least one microcontroller, not shown.

Advantageously, the control unit 30 further comprises a first communication module, not shown, in particular for receiving command orders, the command orders being emitted by a command transmitter, such as the local command unit 2 or the central command unit, these orders being intended to control the motorized drive device 17.

Preferably, the first communication module of the control unit 30 is wireless. In particular, the first communication module is configured to receive radio command orders.

Advantageously, the first communication module may also make it possible to receive command orders transmitted by wired means.

Advantageously, the control unit 30, the local command unit 2 and/or the central command unit can communicate with a weather station, located inside the building or outside the building, including, in particular, one or more sensors that can be configured to determine, for example, temperature, luminosity or wind speed, in the case where the weather station is outside the building.

Advantageously, the control unit 30, the local command unit 2 and/or the central command unit can also communicate with a server, not shown, so as to control the motorized drive device 17 and, more particularly, the first and second electromechanical actuators 18, 20 according to data made available remotely via a communication network, in particular an internet network that can be connected to the server.

The control unit 30 can be controlled from the local command unit 2 or the central command unit. The local command unit 2 or central command unit is provided with a control keyboard. The control keyboard of the local command unit 2 or central command unit comprises one or more selection elements 42, 44, 6 and, optionally, one or more display elements.

By way of non-limiting examples, the selection elements may include push buttons and/or touch sensitive keys. The display elements may include light-emitting diodes and/or a liquid crystal display (LCD) or thin film transistor (TFT) display. The selection and display elements can also be made by means of a touch screen.

The local command unit 2 or central command unit comprises at least a second communication module.

Thus, the second communication module of the local command unit 2 or central command unit is configured to transmit, in other words emits, command orders, in particular by wireless means, for example by radio, or by wired means.

Furthermore, the second communication module of the local command unit 2 or central command unit may also be configured to receive, in other words receives, command orders, in particular via the same means.

The second communication module of the local command unit 2 or central command unit is configured to communicate, in other words communicates, with the first communication module of the control unit 30.

Thus, the second communication module of the local command unit 2 or central command unit exchanges command orders with the first communication module of the control unit 30, either mono- or bidirectionally.

Advantageously, the local command unit 2 is a control point, which may be fixed or nomadic. A fixed control point can be a control box intended to be fixed on a façade of a building wall or on a face of a frame of a window or a door. A nomadic control point may be a remote control, a smartphone or a tablet.

Advantageously, the local command unit 2 or central command unit further comprises a controller.

The motorized drive device 17, in particular the control unit 30, is, preferably, configured to execute command orders for moving, especially folding as well as deploying, the screen 13. These command orders can be emitted, especially, by the local command unit 2 or central command unit.

The motorized drive device 17 can be controlled by the user, for example by receiving a command order corresponding to pressing the or one of the selection elements 42, 44, 6 of the local command unit 2 or central command unit.

The motorized drive device 17 may also be controlled automatically, for example by receiving a command order corresponding to at least one signal from at least one sensor and/or a signal from a clock of the control unit 30, in particular the microcontroller. The sensor and/or clock may be integrated into the local command unit 2 or central command unit.

Advantageously, the motorized drive device 17 may also comprise an end-of-travel position and/or obstacle detection device, which may be mechanical or electronic.

The motorized drive device 17 and, more particularly, each of the first and second electromechanical actuators 18, 20 is supplied with electrical energy by an electrical energy supply source, not shown, which may be either a mains power supply network or a battery, which can be recharged, for example, by a photovoltaic panel, not shown.

Here, the motorized drive device 17 comprises an electrical power cable, not shown, making it possible to supply it with electrical power from the electrical power supply source.

Advantageously, the electrical power cable may comprise at least one electrical connector, especially one at each end or a single connector at one end. This electrical power cable may be, for example, a cord, in the case where the motorized drive device 17 is supplied with electrical power from a mains power supply network, that may have, for example, a 110 V or 230 V supply voltage, or a dongle provided with plugs of the RJ 45 type (acronym for "Registered Jack"), in the case where the motorized drive device 17 is supplied with electrical power from an ethernet network.

Advantageously, each of the first and second electromechanical actuators 18, 20 comprises a casing, not shown, in particular a tubular casing. Furthermore, each of the first and second electric motors is mounted within the casing, in an assembled configuration of the first or second electromechanical actuator 18, 20. Similarly, the control unit 30 may be mounted within the casing of one of the first and second electromechanical actuators 18, 20.

The casing may be, for example, cylindrical in shape, especially revolving or parallelepiped in shape.

In one example embodiment, the casing is made of a metallic material.

The casing material is not limiting and can be different. It may be, in particular, a plastic material.

In the example embodiment illustrated in FIGS. 1 to 8, the local command unit 2 is a remote control. This local command unit 2 comprises a first selection element 42, which may correspond to a first so-called "high" control button, and a second selection element 44, which may correspond to a second so-called "low" control button. Furthermore, the local command unit 2 comprises a third selection element 6, distinct from the first and second selection elements 42, 44, which may be, for example, a thumbwheel. Here, the local command unit 2 is a mobile command device, intended to be taken in hand by the user and which can be moved relative to the rest of the installation I. The local command unit 2 is configured to control the drive device 17.

In this first embodiment of the installation I, illustrated in FIGS. 1 to 8, the motorized drive device 17 comprises the first electromechanical actuator 18, including the first electric motor, which may be referred to as the master, and the second electromechanical actuator 20, including the second electric motor, which may be referred to as the slave. The first electromechanical actuator 18 and the second electromechanical actuator 20 are electrically connected by an electrical connection 19. Each of the first and second electromechanical actuators 18, 20 is configured to rotate one of the top or bottom winding shafts 22, 24.

In a variant, the first electric motor of the first electromechanical actuator 18 may be referred to as a slave. Furthermore, the second electric motor of the second electromechanical actuator 20 may be referred to as a master.

Through the electrical link 19, each of the first and second electromechanical actuators 18, 20, and, as a result, each of the first and second electric motors, is controlled depending on command orders transmitted to the other of the first and second electromechanical actuators 18, 20. The first electromechanical actuator 18 and, as a result, the first electric motor, may thus be controlled depending on the position and/or movement of the bottom bar 12. Furthermore, the second electromechanical actuator 20 and, as a result, the second electric motor, may thus be controlled depending on the position and/or movement of the top bar 10.

In this first embodiment of the installation I, illustrated in FIGS. 1 to 8, the top and bottom winding shafts 22, 24 are parallel but not coaxial. Furthermore, the first and second electromechanical actuators 18, 20 are arranged at one end of the housing 8 and at one end of one of the top or bottom winding shafts 22, 24, respectively. More particularly, each of the first and second electromechanical actuators 18, 20 is arranged along the axis of one of the top or bottom winding shafts 22, 24 that it drives.

The drive device 17 further comprises the control unit 30 for controlling the first and second electromechanical actuators 18, 20, according to a command order received from the local command unit 2 or central command unit. Here and as illustrated in FIG. 1, the control unit 30 is connected to the first and second electromechanical actuators 18, 20, respectively, by a control line 32, 34.

Instead of the electrical connection 19, the control unit 30 and the control lines 32, 34 can be used to control one of the first and second electromechanical actuators 18, 20 depending on the position and/or movement of the top or bottom bar 10, 12 controlled by the other of the first and second electromechanical actuators 18, 20.

In FIG. 1, the housing 8 is illustrated with its front face detached for visualization of the motorized drive device 17. In FIGS. 2 through 8, the housing 8 is illustrated in an external view.

The local command unit 2 or central command unit is an interface that allows a user to control the blind 9 to position the screen 13 as desired. The local command unit 2 or central command unit can be programmed in different configurations to adjust the occultation of the opening by the screen 13.

In a first operating configuration of the control unit 30, which corresponds to a first embodiment of a method for controlling operation of the installation I, the first selection element 42 controls the top bar 10 through the control unit 30, in a first direction, and the second selection element 44 controls the top bar 10 through the control unit 30, in a second direction opposite to the first direction.

For example, when the user presses the first selection element 42, in other words the "up" button 42, the top bar 10 moves up. Furthermore, when the user presses the second selection element 44, in other words the "down" button 44, the top bar 10 moves down.

Here, the distance traveled by the top bar 10 or bottom bar 12 is independent of the time of pressing the first or second selection element 42, 44. The top bar 10 or bottom bar 12 is stopped in a position, desired by the user, by pressing again on the first or second selection element 42, 44.

In a variant, the distance covered by the top bar 10 or bottom bar 12 is proportional to the time of pressing the first or second selection element 42, 44.

Moreover, the third selection element 6 being a thumbwheel, when the user rotates the thumbwheel clockwise, the bottom bar 12 moves down. Furthermore, when the user turns the thumbwheel counterclockwise, the bottom bar 12 moves up. This operation can be reversed according to the user's preference. The distance traveled by the bottom bar 12 is proportional to a number of increments of rotational movement of the third selection element 6.

Figure 2:
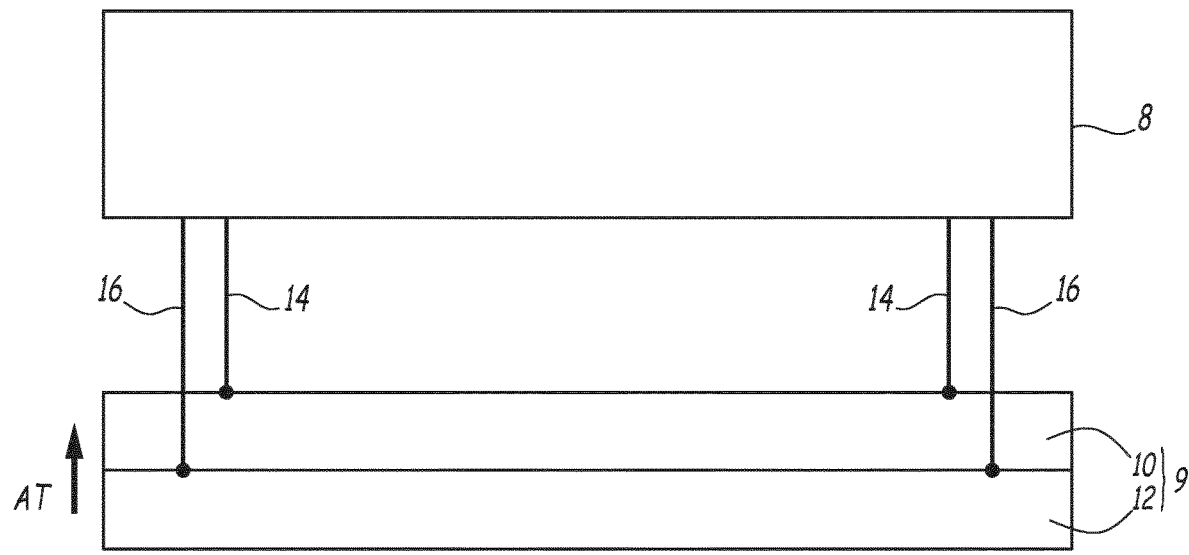
FIG. 2 is a schematic view of the installation illustrated in FIG. 1, where the top and bottom bars of the occultation device are in a second state.
Figure 2:
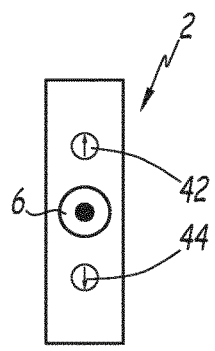
Figure 3:
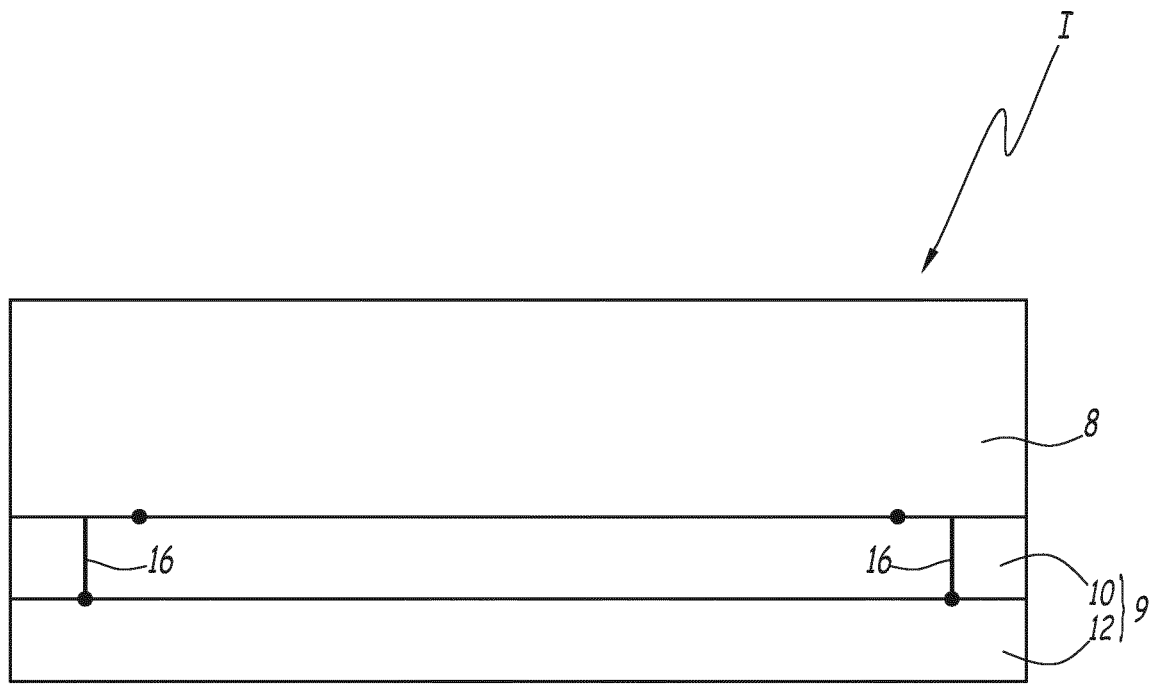
FIG. 3 is a schematic view of the installation illustrated in FIGS. 1 and 2, where the top and bottom bars of the occultation device are in a third state.
Figure 3:
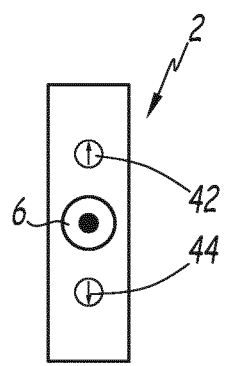

In this first configuration, when the second electromechanical actuator 20 and, as a result, the second electric motor, is controlled by the control unit 30, the bottom bar 12 performs an ascendant movement A12, in other words upward, as illustrated in FIG. 1, and this ascendant movement A12 is maintained long enough, the bottom bar 12 comes into contact with the top bar 10, as illustrated in FIG. 2. If the ascendant movement of the bottom bar 12 is maintained, due to the number of increments resulting from the operation of the third selection element 6, the first and second electromechanical actuators 18, 20 are controlled by the control unit 30 and the top and bottom bars 10, 12 are driven in a common upward movement AT, which is identical in direction and speed for the top and bottom bars 10, 12, until they both reach a predetermined high position, this predetermined high position being able a high end-of-travel position against the housing 8, as illustrated in FIG. 3. In this predetermined high position, the top bar 10 abuts the housing 8 and the bottom bar 12 abuts the top bar 10. Depending on the number of increments resulting from the operation of the third selection element 6, the predetermined high position may also be an intermediate position between that illustrated in FIG. 2 and that illustrated in FIG. 3. In this case, in this predetermined high position, the top bar 10 does not abut the housing 8 but the bottom bar 12 abuts the top bar 10.

It can be foreseen that the situation is analogous during a descendant movement, in other words downward, namely that the top and bottom bars 10, 12 move together, in an identical movement in direction and speed, from the moment when the top bar 10 has joined the bottom bar 12, until they reach a predetermined low position at the same time, this predetermined low position being able to be a low end-of-travel position.

In this first embodiment of the method, one of the top or bottom bars 10, 12, moving drives with it the other of the stationary top or bottom bars 10, 12 at the time they are brought into contact for further movement.

In the second through fifth embodiments of the method described below, the structural elements of the installation I are the same as those in FIG. 1, since it is the same installation I. Only the movements of the top and bottom bars 10, 12 differ between these different embodiments.

Figure 4:
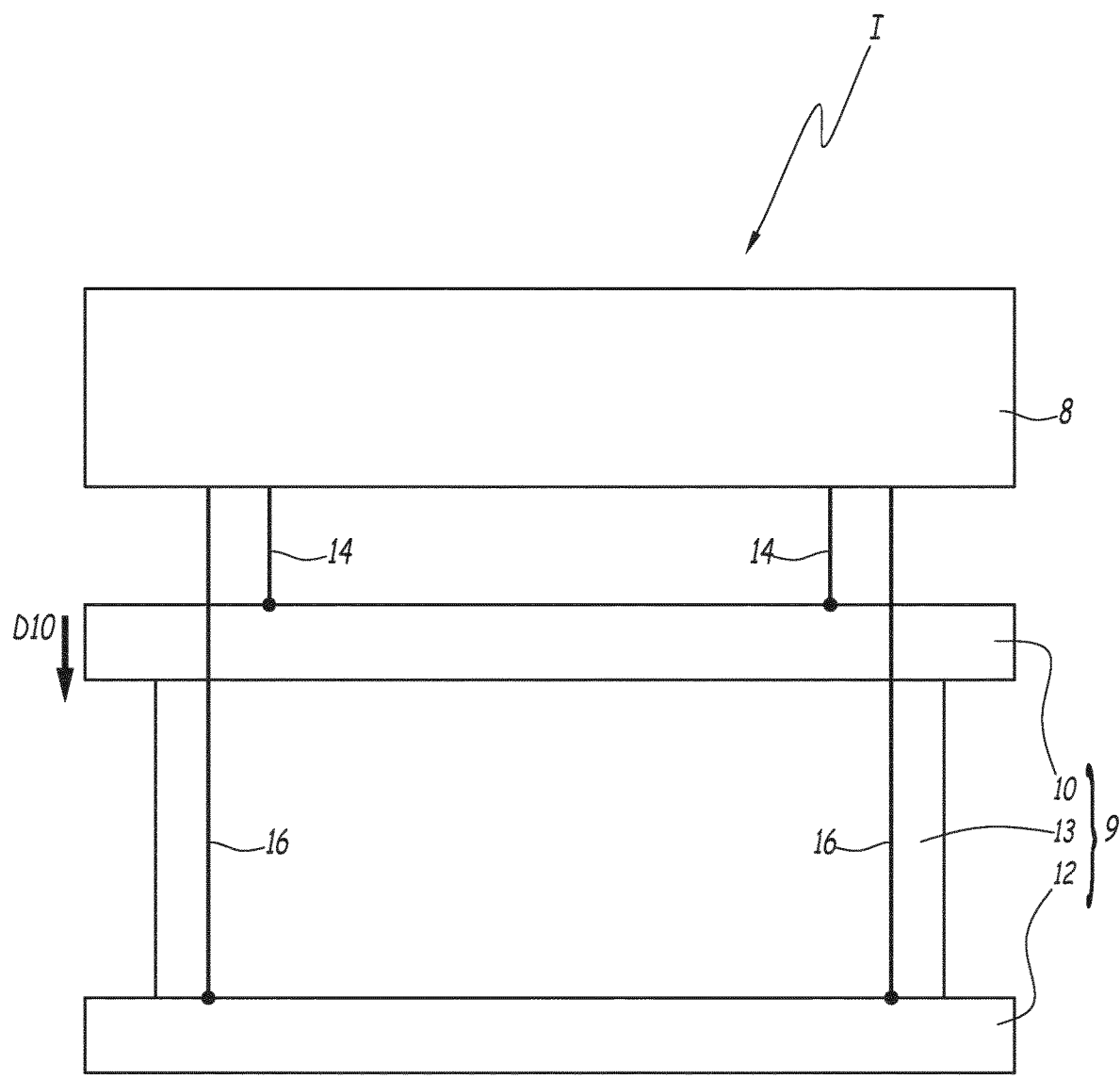
FIG. 4 is a schematic view of the installation illustrated in FIGS. 1 to 3, where the top and bottom bars of the occultation device are in a fourth state.
Figure 4:
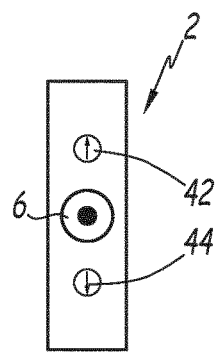
Figure 5:
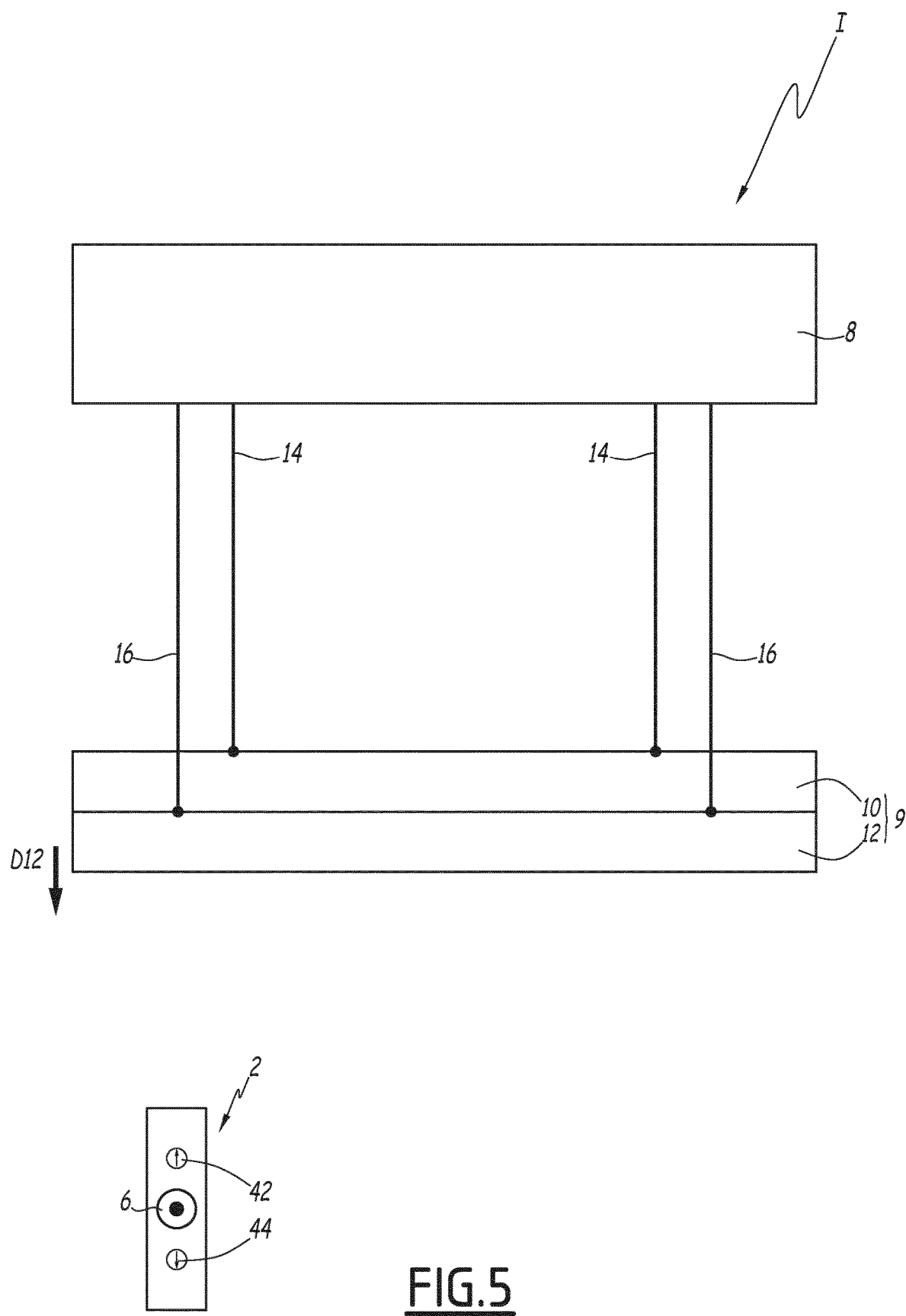
FIG. 5 is a schematic view of the installation illustrated in FIGS. 1 to 4, where the top and bottom bars of the occultation device are in a fifth state.

In a second operating configuration of the control unit 30, which corresponds to a second embodiment of the method for controlling operation of the installation I, illustrated in FIGS. 4 and 5, the first and second selection elements 42, 44 control the top bar 10 and the third selection element 6 controls the bottom bar 12, as in the first operating configuration of the control unit 30. When the first electromechanical actuator 18 and, as a result, the first electric motor, is controlled by the control unit 30, the top bar 10 performs a descendant movement D10, in other words downward, as illustrated in FIG. 4, the bottom bar 12 has previously been lowered and this descendant movement D10 is maintained long enough, the top bar 10 comes into contact with the bottom bar 12, as illustrated in FIG. 5. The first electromechanical actuator 18 is then controlled by the control unit 30 to bring the top bar 10 to a stop and the second electromechanical actuator 20 and, as a result, the second electric motor, is controlled by the control unit 30 to cause the bottom bar 12 performs a descendant movement D12 to continue the descendant movement initiated by the top bar 10 and to move the bottom bar 12 away from the top bar 10, on a trajectory that depends on the command made at the second selection element 44. The lower position reached by the bottom bar 12 may or may not be the predetermined low position.

A similar situation is implemented during an ascendant movement, namely that the top bar 10 continues the upward movement and moves away from the bottom bar 12 which comes to a standstill from the moment the bottom bar 12 has joined the top bar 10, until it reaches a high position; this high position may or may not be the predetermined high position.

In this second embodiment of the method, one of the moving top or bottom bars 10, 12 "pushes" the other of the stationary top or bottom bars 10, 12 away from the moment they come into contact to initiate further movement.

Figure 6:
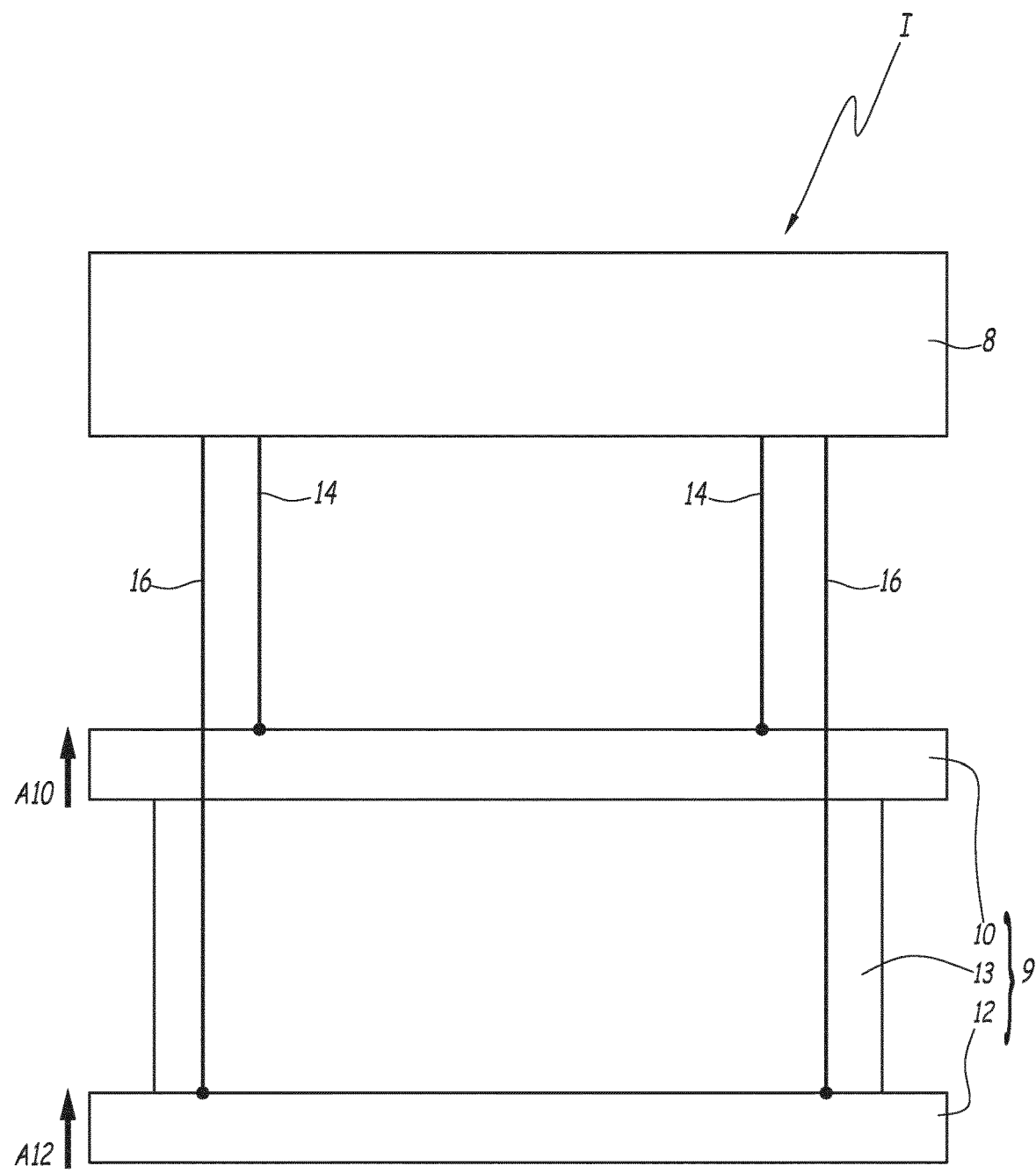
FIG. 6 is a schematic view of the installation illustrated in FIGS. 1 to 5, where the top and bottom bars of the occultation device are in a sixth state.
Figure 6:
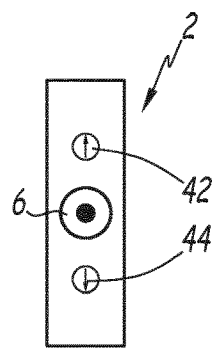

In a third operating configuration of the control unit 30, which corresponds to a third embodiment of the method for controlling operation of the installation I, illustrated in FIG. 6, when none of the top or bottom bars 10, 12 is in a predetermined high or low position, in other words the high or low end-of-travel position, that is to say when none of the first and second cords 14, 16 are fully wound or unwound around the first and second winding pulleys 26, 28, the first or second selection element 42, 44 drives the top and bottom bars 10, 12 simultaneously, in the same direction, to move the occultation area defined by the screen 13 deployed between these top and bottom bars 10, 12.

For example, as illustrated in FIG. 6, when the user presses the first selection element 42, in other words the "up" button, the first electromechanical actuator 18 and, as a result, the first electric motor, is controlled by the control unit 30 and the top bar 10 makes an ascendant movement A10 and, simultaneously, the second electromechanical actuator 20 and, as a result, the second electric motor, is controlled by the control unit 30 and the bottom bar 12 makes an ascendant movement A12. The top and bottom bars 10, 12 move upward identically in direction and speed, so that a gap between the top and bottom bars 10, 12 remains constant.

Similarly, when the user presses the second selection element 44, in other words the "down" button, the top and bottom bars 10, 12 move downward, at the same speed and in the same direction.

The movement of the top and bottom bars 10, 12 initiated by pressing one of the first or second selection elements 42, 44 is only stopped when a stop command is sent by the user via the local or central command unit 2, for example by pressing the previously activated first or second selection element 42, 44 again, or when one of the top and bottom bars 10, 12 reaches one of the predetermined high or low positions, in other words the high or low end-of-travel position.

When one of the top or bottom bars 10, 12 is in one of the predetermined high or low positions, in other words the high or low end-of-travel position, it is said to be "anchored". Furthermore, the use of the first or second selection element 42, 44 controls the other top or bottom bar 10, 12, in other words the one not in either the predetermined high or low position. The first selection element 42, in other words the "up" button, moves up this top or bottom bar 10, 12 and the second selection element 44, in other words the "down" button, moves down this top or bottom bar 10, 12.

When the top bar 10 is at an upper stop, in other words in the predetermined high position, and the bottom bar 12 is at a lower stop, in other words in the predetermined low position, then the top and bottom bars 10, 12 are said to be "anchored." Furthermore, pressing the first selection element 42, in other words the "up" button, causes the bottom bar 12 to move upward and pressing the second selection element 44, in other words the "down" button, causes the top bar 10 to move downward.

Figure 7:
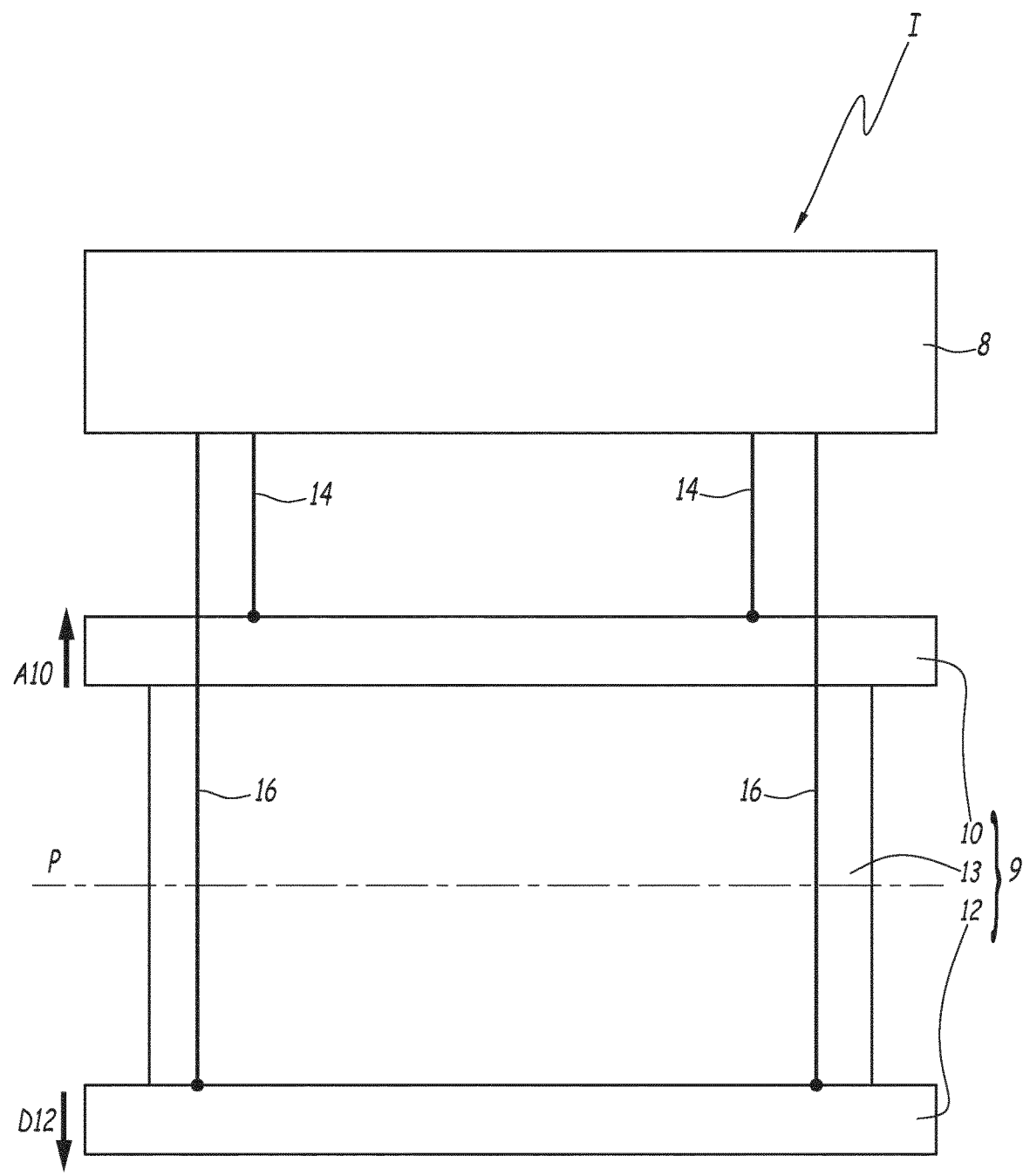
FIG. 7 is a schematic view of the installation illustrated in FIGS. 1 to 6, where the top and bottom bars of the occultation device are in a seventh state.
Figure 7:
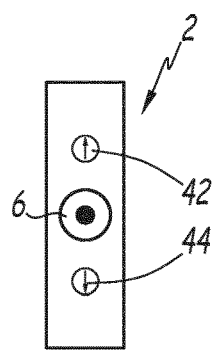

In a fourth operating configuration of the control unit 30, which corresponds to a fourth embodiment of the method for controlling the operation of the installation I, illustrated in FIG. 7, the third selection element 6 adjusts the height of the occultation area and the role of the first and second selection elements 42, 44 may be identical to that of the third operating configuration.

For example, when the third selection element 6 is rotated clockwise, the height of the occultation area by the screen 13 increases. To do this, the first electromechanical actuator 18 and, as a result, the first electric motor, is controlled by the control unit 30 so that the top bar 10 makes an ascendant movement A10, in other words upward, and the second electromechanical actuator 20 and, as a result, the second electric motor, is controlled by the control unit 30 so that the bottom bar 12 makes a descendant movement D12, in other words downward, as illustrated in FIG. 7.

For ease of use, the top and bottom bars 10, 12 move away from each other away from a median plane P. The median plane P is located, between the top and bottom bars 10, 12, equidistant from the top and bottom bars 10, 12. The top and bottom bars 10, 12 moving identically in speed and in the opposite direction, the median plane P does not move when the top and bottom bars 10, 12 move.

Similarly, when the third selection element 6 is rotated counterclockwise, the height of the occultation area by the screen 13 decreases. To do this, the first electromechanical actuator 18 and, as a result, the first electric motor, is controlled by the control unit 30 so as to move the top bar 10 downward and, simultaneously, the second electromechanical actuator 20 and, as a result, the second electric motor, is controlled by the control unit 30 so as to move the bottom bar 12 upward, in a movement that is identical in speed and opposite in direction to that of the top bar 10.

Figure 8:
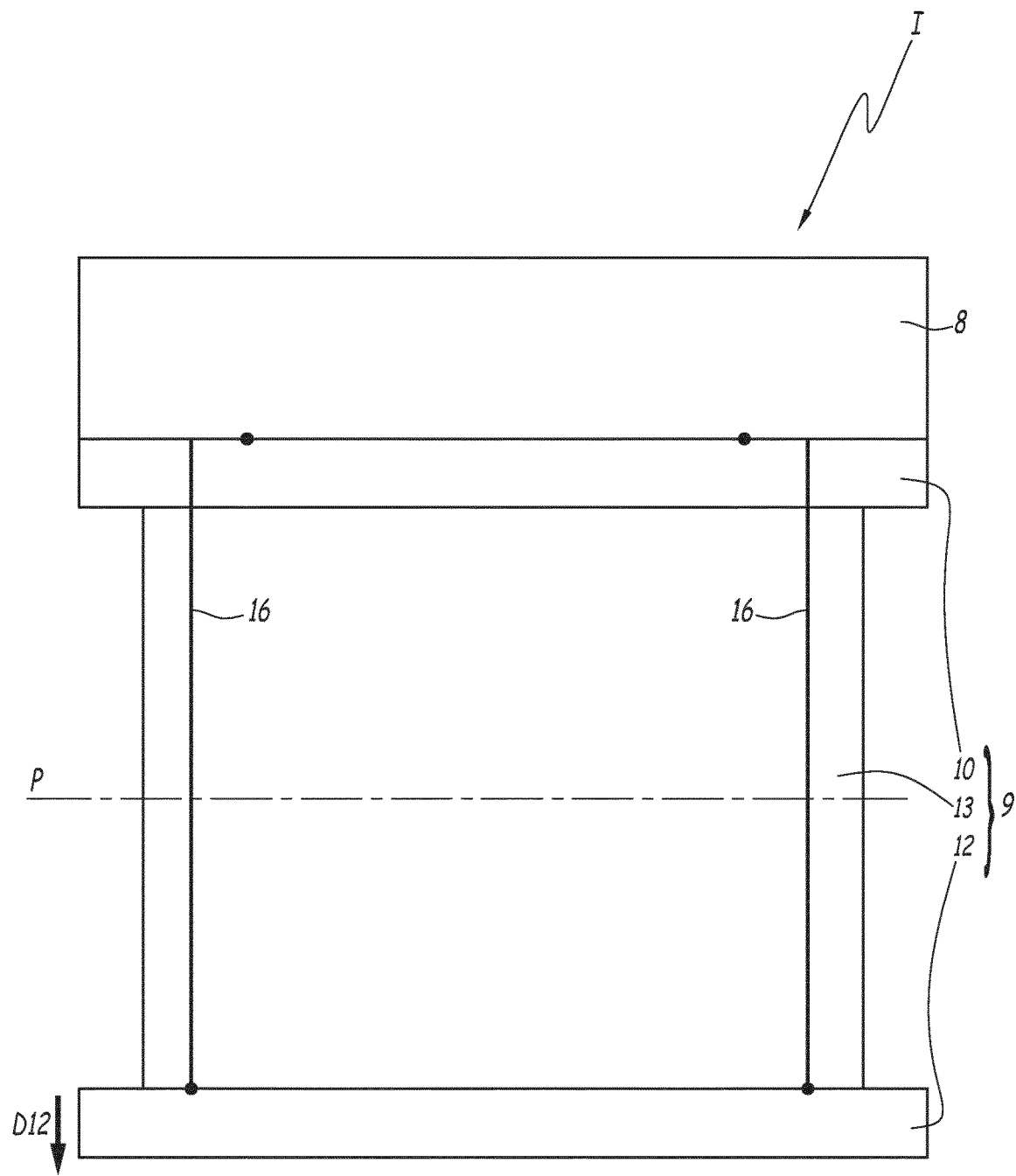
FIG. 8 is a schematic view of the installation illustrated in FIGS. 1 to 7, where the top and bottom bars of the occultation device are in an eighth state.
Figure 8:
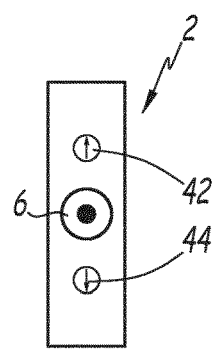

In a fifth operating configuration of the control unit 30, based on the fourth operating configuration of the control unit 30, which corresponds to a fifth embodiment of the method for controlling operation of the installation I, illustrated in FIG. 8, when, upon increasing the height of the occultation area by the screen 13, one of the top or bottom bars 10, 12 reaches a predetermined high or low position, in other words the high or low end-of-travel position, it stops and the other of the top or bottom bars 10, 12 continues the movement controlled by the user by operating the third selection element 6.

In the example of FIG. 8, with the top bar 10 having arrived in the predetermined high position, in other words the high end-of-travel position, the first electromechanical actuator 18 and, as a result, the first electric motor, is controlled by the control unit 30 to stop the top bar 10. Furthermore, the second electromechanical actuator 20 and, as a result, the second electric motor, is controlled so that the bottom bar 12 makes a descendant movement D12, moving away from the top bar 10 and from the median plane P, which is no longer at an equal distance from the top and bottom bars 10, 12.

A similar situation occurs when the bottom bar 12 reaches the predetermined low position, in other words the low end-of-travel position, when the height of the occultation area is increased by the screen 13. The bottom bar 12 is then stopped and the top bar 10 continues its ascendant movement away from the bottom bar 12.

According to an optional feature, that can be added to the five operating configurations of the control unit 30, a double press on either the first or second selection elements 42, 44 causes a stacking of the top and bottom bars 10, 12 in the predetermined high or low position, in other words the high or low-end-of-travel position, depending on the direction requested via the local command unit 2 or central command unit.

For example, after a double press, in particular rapid pressing, on the first selection element 42, in other words the "up" button, the top bar 10 moves upward until it reaches the predetermined high position, in other words the high end-of-travel position, in particular abutting against the housing 8, and, simultaneously, the bottom bar 12 moves upward until it reaches the predetermined high position, in other words the high end-of-travel position, in particular abutting against the top bar 10, as in FIG. 3.

Similarly, after a double press, in particular rapid pressing, on the second selection element 44, in other words the "down" button, the bottom bar 12 moves downward until it reaches the predetermined low position, in other words the low end-of-travel position, in particular when the second cords 16 are fully unwound from the second winding pulleys 28, and, simultaneously, the top bar 10 moves downward until it reaches the low position, in other words the low end-of-travel position, in particular abutting against the bottom bar 12.

According to another optional feature, that can be added to the five operating configurations of the control unit 30, a press, in particular a long pressing, on the first selection element 42, in other words the "up" key, controls the stacking of the top and bottom bars 10, 12 in the predetermined high position, in other words the high end-of-travel position, as in FIG. 3. The screen 13 of the blind 9 is thus completely folded, in this case. Furthermore, a press, in particular a long pressing, on the second selection element 44, in other words the "down" button, allows the screen 13 to be fully deployed by raising the top bar 10 to the predetermined high position, in other words the high end-of-travel position, and by lowering the bottom bar 12 to the predetermined low position, in other words the low end-of-travel position. The screen 13 of the blind 9 is thus fully deployed, in this case.

The method for controlling operation of the installation I according to the invention thus makes it possible, regardless of the configuration chosen by the user, to control a differentiated or simultaneous movement of the top and bottom bars 10, 12.

Figure 9:
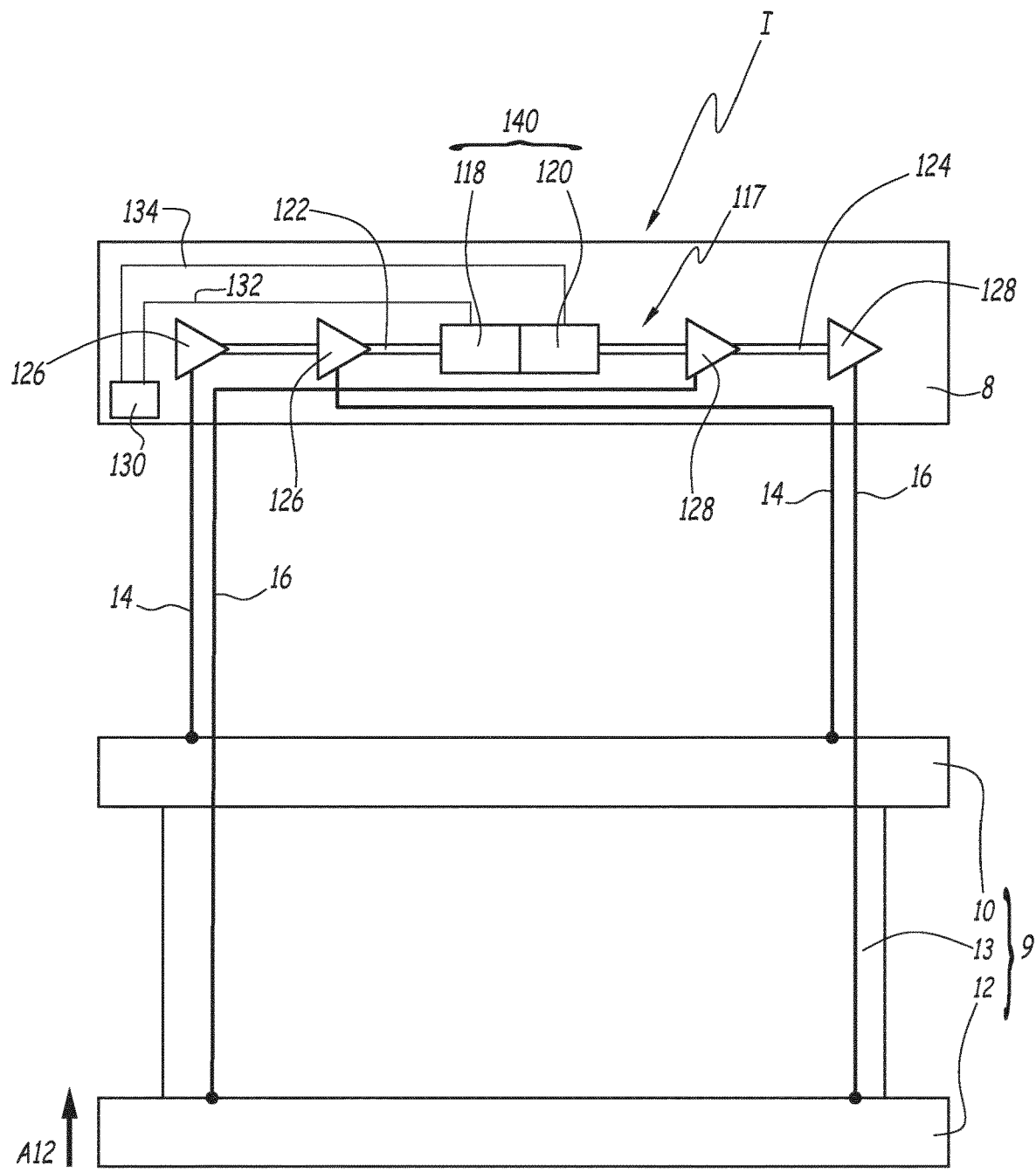
FIG. 9 is a schematic view of a solar protection installation according to a second embodiment, configured to implement a method for controlling operation thereof according to the invention, where top and bottom bars of an occultation device are in a first state.
Figure 9:
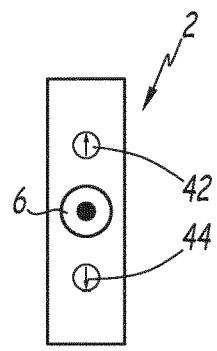

FIG. 9 shows an installation I according to a second embodiment of the invention and comprising a motorized drive device 117. The motorized drive device 117 of the second embodiment is functionally similar to the motorized drive device 17 of the first embodiment, but differs from it in structure. The elements of the installation I analogous to those of the first embodiment have the same references increased by 100 and operate in the same manner. In particular, the local command unit 102 of this second embodiment is identical to the local command unit 2 of the first embodiment. As a result, these selection elements 42, 44, 6 retain the same references. In the following, the differences between the first and second embodiments of the installation I are mainly described for the motorized drive device 17, 117.

The installation I according to the second embodiment of the invention and the motorized drive device 117 are now described, with reference to FIG. 9.

In this second embodiment, the motorized drive device 117 comprises a first electromechanical actuator 118 and a second electromechanical actuator 120. The first electromechanical actuator 118 comprises a first electric motor, not shown, which may be referred to as a master. Furthermore, the second electromechanical actuator 120 comprises a second electric motor, not shown, which may be referred to as a slave.

In a variant, the first electric motor of the first electromechanical actuator 118 may be referred to as a slave. Furthermore, the second electric motor of the second electromechanical actuator 120 may be referred to as a master.

The first electromechanical actuator 118 and the second electromechanical actuator 120 have complementary shapes, so that they fit into each other. The nesting of the first electromechanical actuator 118 and the second electromechanical actuator 120 provides an electrical connection, not shown, between the first and second electromechanical actuators 118, 120, without requiring a connecting cable between them, as well as a mechanical connection.

The motorized drive device 117 further comprises two winding shafts 122, 124, which are coaxial. The first winding shaft 122 is provided with two first winding pulleys 126, so as to wind or unwind, simultaneously, the first cords 14 and thus raise or lower the top bar 10. The second winding shaft 124 is also provided with two second winding pulleys 128, so as to wind or unwind, simultaneously, the second cords 16 and thus raise or lower the bottom bar 12.

The first and second winding pulleys 126, 128 are also frustoconical in shape, in this second embodiment.

In order to reduce the size of the motorized drive device 117, the first and second electromechanical actuators 118, 120 are nested and the first and second winding shafts 122, 124 are arranged on opposite sides of a block 140 formed by the first and second electromechanical actuators 118, 120, with each of the first and second winding shafts 122, 124 connected to an output shaft, not shown, of the first and second electromechanical actuators 118, 120.

The first and second electromechanical actuators 118, 120 and, as a result, the first and second electric motors, are controlled by a control unit 130, in particular a common control unit, to which they are respectively connected via two control lines 132, 134. The control unit 130 makes it possible to implement in the second embodiment, with the first and second electromechanical actuators 118, 120, the same operating configurations of the control method in operation of the installation I as mentioned above with respect to the installation I of the first embodiment.

Regardless of the embodiment and as illustrated in FIGS. 1 and 9, the control unit 30, 130 may be formed as a single part and arranged outside the first and second electromechanical actuators 18, 118, 20, 120. In this case, it is not mandatory to manage a master/slave operation between the first and second electric motors of these first and second electromechanical actuators 18, 118, 20, 120.

In a variant, not shown, the control unit 30, 130 is divided into two parts, with one part integrated into each of the first and second electromechanical actuators 18, 20, 118, 120.

The first electromechanical actuator 18, 118 comprises a first electric motor, referred to as the master, and the second electromechanical actuator 20, 120 comprises a second electric motor, referred to as the slave, or vice versa. In this case, each of the first and second electromechanical actuators 18, 20, 118, 120 comprises a portion of the control unit 30, 130, for controlling the second electromechanical actuator 20, 120 depending on the position and/or movement of the top bar 10, 110 driven by the first electromechanical actuator 18, 118, or vice versa.

In a variant, not shown, the first and second selection elements 42, 44 may be replaced, for example, by a thumbwheel, as with the third selection element 6.

According to another variant, not shown, the third selection element 6 may be replaced, for example, by an "up" button and a "down" button, as for the first and second selection elements 42, 44.

In a variant, not shown, the local command unit 2, 102 can be installed at a fixed location in the installation I. In this case, the first and second communication modules of the respective control unit 30, 130 and local command unit 2, 102 can, optionally, be wired or wireless.

In a variant, the action controlled by the third selection element 6 is selected by pressing on the first and second selection element(s) 42, 44, which act as navigation elements in a menu. For example, a short press on the first selection element 42 allows the third selection element 6 to control the top bar 10 alone and a short press on the second selection element 44 allows the third selection element 6 to control the bottom bar 12 alone.

In a variant, not shown, in the first embodiment of the installation I, the electrical connection between the first and second electromechanical actuators 18, 20 is made via the control unit 30 and control lines 32, 34.

The above-mentioned embodiments and variants can be combined with each other to generate new embodiments without going outside the scope of the invention by the claims.

The invention claimed is:

1. A method for controlling operation of a solar protection installation including an occultation device and a motorized drive device, the occultation device including a top bar, a bottom bar, and a screen disposed between the top bar and the bottom bar, the motorized drive device configured to deploy and fold the screen, the motorized drive device including a first electromechanical actuator configured to move the top bar, a second electromechanical actuator configured to move the bottom bar, and a first controller configured to control the first and second electromechanical actuators, the method comprising:
controlling, by the first controller, one of:
(i) the first electromechanical actuator to move the top bar and then the second electromechanical actuator to move the bottom bar depending on one or more of the position and movement of the top bar, and
(ii) the second electromechanical actuator to move the bottom bar and then the first electromechanical actuator to move the top bar depending on one or more of the position and movement of the bottom bar,
wherein:
(i) in a first operating configuration of the first controller, the first electromechanical actuator is controlled by the first controller so that the top bar makes an upward movement, and the second electromechanical actuator is simultaneously controlled by the first controller so that the bottom bar makes an upward movement, such that an occultation area defined by the screen makes an upward movement while keeping a constant height, said constant height being defined by a first gap between the top bar and the bottom bar, the top bar and the bottom bar moving upward at the same speed and simultaneously moving the screen, the upward movement of the occultation area being stopped when the top bar reaches an end-of-travel position or when the first controller receives a stop command, and
(ii) in a second operating configuration of the first controller, the first electromechanical actuator is controlled by the first controller so that the top bar makes a downward movement, and the second electromechanical actuator is simultaneously controlled by the first controller so that the bottom bar makes a downward movement, such that the occultation area makes a downward movement while keeping a constant height, said constant height being defined by a second gap between the top bar and the bottom bar, the top bar and the bottom bar moving downward at the same speed and simultaneously moving the screen, the downward movement of the occultation area being stopped when the bottom bar reaches an end-of-travel position or when the first controller receives the stop command.

2. The method for controlling operation of the solar protection installation according to claim 1,
wherein the installation further includes a second controller including a plurality of selectors, the second controller controlling the first controller, and
wherein the first operating configuration is initiated by at least a first selector of the plurality of selectors and the second operating configuration is initiated by at least a second selector of the plurality of selectors.

3. A method for controlling operation of a solar protection installation including an occultation device and a motorized drive device, the occultation device including a top bar, a bottom bar, and a screen disposed between the top bar and the bottom bar, the motorized drive device configured to deploy and fold the screen, the motorized drive device including a first electromechanical actuator configured to move the top bar, a second electromechanical actuator configured to move the bottom bar, and a first controller configured to control the first and second electromechanical actuators, the method comprising:
controlling, by the first controller, one of:
(i) the first electromechanical actuator to move the top bar and then the second electromechanical actuator to move the bottom bar depending on one or more of the position and movement of the top bar, and
(ii) the second electromechanical actuator to move the bottom bar and then the first electromechanical actuator to move the top bar depending on one or more of the position and movement of the bottom bar,
wherein:
(i) in a first operating configuration of the first controller, the second electromechanical actuator is controlled by the first controller to move the bottom bar upward, until the bottom bar contacts the top bar, then
the first and second electromechanical actuators are controlled by the first controller to simultaneously move the top bar and the bottom bar upward, in an identical direction and speed movement for the top bar and the bottom bar, or (ii) in a second operating configuration of the first controller, the first electromechanical actuator is controlled by the first controller to move the top bar downward, until the top bar contacts the bottom bar, then the first and second electromechanical actuators are controlled by the first controller to simultaneously move the top bar and the bottom bar downward, in an identical direction and speed movement for the top bar and the bottom bar.

4. The method for controlling operation of the solar protection installation according to claim 3, wherein the installation further includes a second controller including a plurality of selectors, the second controller controlling the first controller, and wherein the first operating configuration is initiated by at least a first selector of the plurality of selectors and the second operating configuration is initiated by at least a second selector of the plurality of selectors.

5. The method for controlling operation of the solar protection installation according to claim 4, wherein the first operating configuration is initiated by a double press on the first selector, and wherein the second operating configuration is initiated by a double press on the second selector.

6. A method for controlling operation of a solar protection installation including an occultation device and a motorized drive device, the occultation device including a top bar, a bottom bar, and a screen disposed between the top bar and the bottom bar, the motorized drive device configured to deploy and fold the screen, the motorized drive device including a first electromechanical actuator configured to move the top bar, a second electromechanical actuator configured to move the bottom bar, and a first controller configured to control the first and second electromechanical actuators, the method comprising:

controlling, by the first controller, one of:
(i) the first electromechanical actuator to move the top bar and then the second electromechanical actuator to move the bottom bar depending on one or more of the position and movement of the top bar, and
(ii) the second electromechanical actuator to move the bottom bar and then the first electromechanical actuator to move the top bar depending on one or more of the position and movement of the bottom bar, wherein:
(i) in a first operating configuration of the first controller, the first electromechanical actuator is controlled by the first controller to move the top bar downward until the top bar contacts the bottom bar, the first electromechanical actuator is controlled by the first controller to stop the movement of the top bar, then the second electromechanical actuator is controlled by the first controller to move the bottom bar downward and away from the top bar, or
(ii) in a second operating configuration of the first controller, the second electromechanical actuator is controlled by the first controller to move the bottom bar upward until the bottom bar contacts the top bar, the second electromechanical actuator is controlled by the first controller to stop the movement of the bottom bar, then the first electromechanical actuator is controlled by the first controller to move the top bar upward and away from the bottom bar.

7. The method for controlling operation of the solar protection installation according to claim 3, wherein the installation further includes a second controller including a plurality of selectors, the second controller controlling the first controller, and wherein the first operating configuration is initiated by at least a first selector of the plurality of selectors and the second operating configuration is initiated by at least a second selector of the plurality of selectors.

8. A method for controlling operation of a solar protection installation including an occultation device and a motorized drive device, the occultation device including a top bar, a bottom bar, and a screen disposed between the top bar and the bottom bar, the motorized drive device being configured to deploy and fold the screen, the motorized drive device including a first electromechanical actuator configured to move the top bar, a second electromechanical actuator configured to move the bottom bar, and a first controller configured to control the first and second electromechanical actuators, the method comprising:

controlling, by the first controller, one of:
(i) the first electromechanical actuator to move the top bar and then the second electromechanical actuator to move the bottom bar depending on one or more of the position and movement of the top bar, and
(ii) the second electromechanical actuator to move the bottom bar and then the first electromechanical actuator to move the top bar depending on one or more of the position and movement of the bottom bar, wherein:
(i) in a first operating configuration of the first controller, the first electromechanical actuator is controlled by the first controller so that the top bar makes an upward movement, and the second electromechanical actuator is simultaneously controlled by the first controller so that the bottom bar makes a downward movement, such that a height of an occultation area defined by the screen increases, and
(ii) in a second operating configuration of the first controller, the first electromechanical actuator is controlled by the first controller so that the top bar makes a downward movement, and the second electromechanical actuator is simultaneously controlled by the first controller so that the bottom bar makes an upward movement, such that the height of the occultation area defined by the screen decreases.

9. The method for controlling operation of the solar protection installation according to claim 8, wherein:
(i) when the top bar reaches an end-of-travel position, the first controller controls the first electromechanical actuator to stop the movement of the top bar, and the second electromechanical actuator to move the bottom bar away from the top bar, and
(ii) when the bottom bar reaches an end-of-travel position, the first controller controls the second electromechanical actuator to stop the movement of the bottom bar, and the first electromechanical actuator to move the top bar away from the bottom bar.

10. The method for controlling operation of the solar protection installation according to claim 8, wherein the installation further includes a second controller including a plurality of selectors, the second controller controlling the first controller, wherein the first operating configuration is initiated by at least a first selector of the plurality of selectors and the second operating configuration is initiated by at least a second selector of the plurality of selectors.

* * * * *